W. L. SPOON.
SCREEN FOR FLOWING WATER.
APPLICATION FILED APR. 17, 1915.
1,180,798. Patented Apr. 25, 1916.
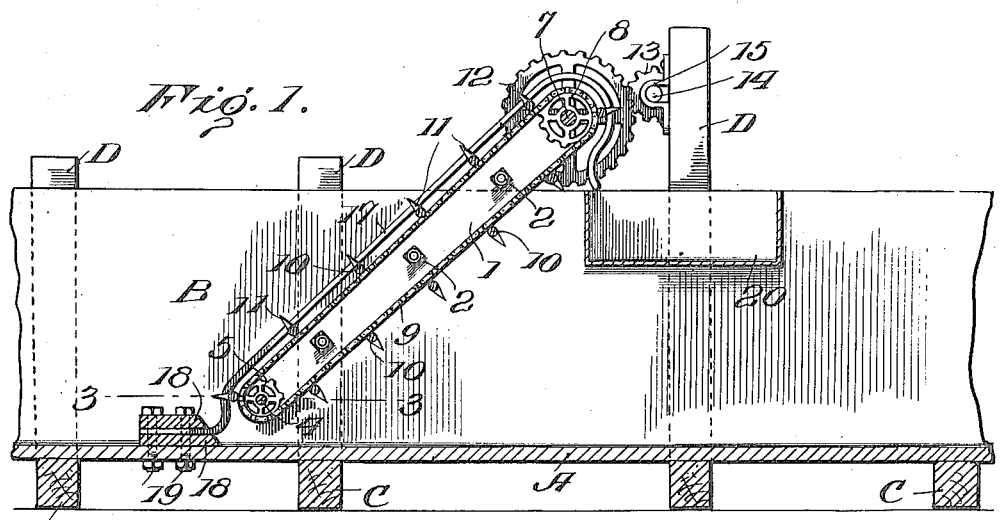
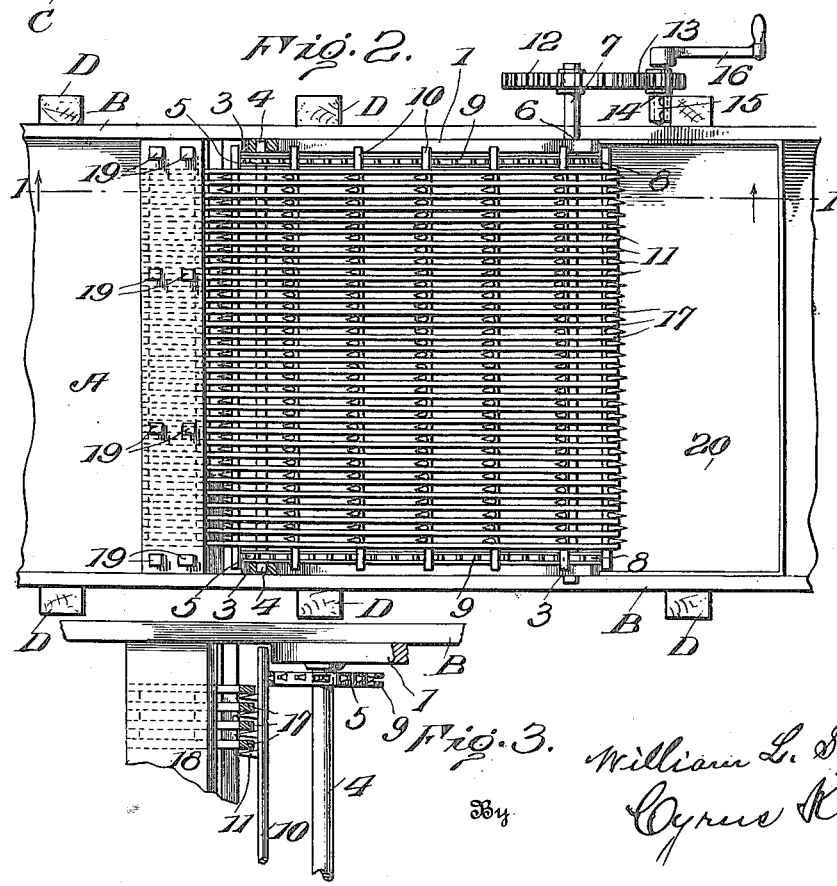

UNITED STATES PATENT OFFICE.

WILLIAM L. SPOON, OF BURLINGTON, NORTH CAROLINA.

SCREEN FOR FLOWING WATER.

1,180,798. Specification of Letters Patent. Patented Apr. 25, 1916.

Application filed April 17, 1915. Serial No. 22,048.

*To all whom it may concern:*

Be it known that I, WILLIAM L. SPOON, a citizen of the United States, residing at Burlington, in the county of Alamance and State of North Carolina, have invented a new and useful Improvement in Screens for Flowing Water, of which the following is a specification, reference being had to the accompanying drawing.

My improvement relates particularly to screens for taking trash carried by the water in chutes, canals, flumes, and head races.

The object of my improvement is to provide an apparatus which is efficient, easily operated and adapted to economical maintenance.

In the accompanying drawings, Figure 1 is an upright section one the line, 1—1, of Fig. 2, illustrating an apparatus embodying my improvement; Fig. 2 is a plan of the same apparatus; Fig. 3 is a horizontal section on the line, 3—3, of Fig. 1.

Referring to said drawings, A is the bottom of a chute, flume or head race in which water flows toward the right.

B, B, are upright side walls of said chute.

C, C, are bottom timbers supporting the bottom.

D, D, are side timbers supporting said side walls. At each side of the chute is a side plate, 1. These plates are flat, and each is secured flatwise against the inner face of one of the side walls by means of bolts, 2, 2, said plates being placed opposite each other and inclined, the upper portion extending forward (with the flow), and the lower portion standing at a short distance above the bottom or floor, A, and the upper end projecting above the side wall. In the lower end of each plate is a bearing, 3, receiving one end of a horizontal shaft, 4, which extends from one of said plates to the other. On said shaft are two wheels, 5, 5, suited to carry chains. In the form shown in the drawings, these wheels are sprocket wheels. In the upper end of each side plate is a bearing, 6, receiving one end of a horizontal shaft, 7, extending from one of said plates to the other. On said shaft are two sprocket wheels, 8, one of which is in the plane of one of the lower sprocket wheels and the other of which is in the plane of the other of said sprocket wheels. Endless sprocket chains, 9, extend around one of the upper wheels and around the corresponding lower wheel. Rake bars, 10, are placed transversely and horizontally across the chains, on the outer faces of the latter, each bar resting on both chains and being secured thereto so as to be carried by the chains when the latter move. Each such bar is shown of proper length to extend across and rest upon the side plates, 1, 1. This prevents sagging of the chains in the up-stream portion of their course. On each brake bar are rake teeth, 11, extending outward away from the chains.

At one end, the upper shaft, 7, projects through its bearing and is there surrounded and keyed to a spur gear wheel, 12, which meshes with a smaller spur gear wheel, 13, surrounding and keyed to a short shaft, 14, which is seated in a bearing, 15, on one of the side timbers. A drive crank, 16, is applied to said shaft for turning the latter and the wheel, 13, whereby rotation is given to the spur gear wheel, 12, and the upper shaft, 7, clock-wise as viewed in Fig. 1, whereby the chains and the rake bars are put into motion, the portion of said chains and the rake bars which are at the time at the up-stream side of the side plates, 1, and the shafts, 4, and, 7, moving obliquely upward in paths parallel to said side plates. In this manner, the chains and the rake bars have endless movement as long as the drive crank is being turned. Such motion might also be imparted to said chains and rake bars by direct engagement with the spur gear wheel, 12.

The portion of the mechanism thus far described has for its function the removal of trash from the up-stream side of the screen bars, 17. Said bars are arranged in upright planes which are parallel to each other and the side walls, B, and to which the shafts, 4, and, 7, are perpendicular. The lower end of each screen bar is rigidly secured to the bottom or floor, A. In the form shown in the drawings, this is accomplished by means of two clamping plates, 18, and bolts, 19, the lower portion of the screen bars being bent into the horizontal and placed between said plates and the bolts extending downward through said plates and said bars and the floor. Thence said bars extend upward and forward along the upper face of the endless carrying mechanism which comprises the chains and the rake bars. Along their lower portions, the screen bars preferably clear the path of the rake bars so that the latter do not engage said bars; but farther upward, the screen bars extend rearward far enough to rest against and be supported by the adjacent rake bars. Above the upper shaft, 7, the screen bars are bent to make them approximately concentric with said shaft, and, after extending below the horizontal plane in which said shaft lies, said screen bars are curved outward until they are outside of the path of the teeth, 11, which, as above described, stand outward on the rake bars, 10. Below said ends of said screen bars is a trash receptacle or apron, 20. Thus the screen bars, 17, have their lower ends secured to and supported by the bottom or floor, A, while above the floor the screen bars are supported only by leaning against the rake bars and the rake teeth which are at the time in the upper portion of the upward course of said bars and teeth.

The teeth, 11, on the rack bars, 10, are so located upon said bars and made of such length as to project outward beyond the screen bars during the upward course of the rake bars and during the downward course of said bars until said teeth come nearly to the free ends of said screen bars. Then said teeth pass into the spaces between said bars, thus freeing themselves from such trash as they may have been carrying.

The operation will be readily understood. The trash carried by the water flowing toward the right in the chute is intercepted by the screen bars. As often as may be desired, the sprocket wheels and the sprocket chains are set into motion by turning the drive crank, 16, or otherwise. When the chains and the rake bars are to be put into motion, the rake teeth, 11, projecting through between the screen bars carry the accumulated trash upward along said bars until said trash is discharged by gravity into the receptacle or apron, 20, the teeth freeing themselves from the trash when the teeth pass inward between the screen bars below the level of the upper shaft, 7. Obviously, the mechanism may be kept in operation continuously; but in most situations it will be quite sufficient to operate it only periodically, and it is manifest that the mechanism will have greater durability if it is operated only as often as may be actually necessary for the removal of trash. Directly after leaving the clamping plates, 18, the screen bars, 17, are bent upward and then curved approximately to conform to the path of the teeth, 11, adjacent said portion of said bars. This permits the teeth to project through between said bars closer to the floor than would be the case if the bars extended in a straight line to the clamping plates. If the latter construction were used, there would be a considerable space in front of the lower portion of the screen bars which would not be reached by the teeth. It is to be observed that above the attachment of the screen bars to the floor the teeth, 11, constitute the means for spacing and sustaining the screen bars against bodily lateral movement and against twisting and turning so as to present their broad faces to the flowing water, the entire length, to and including the upper ends, of every screen bar above the floor being free from any member on which the trash carried by the rake teeth may become engaged and clogged. And these teeth constitute a traveling spacing and lateral supporting means for the screen bars; and the teeth perform the double function of spacing the screen bars and engaging and conveying the trash which lodges against the upstream face of the screen bars. The form of the upper ends of the screen bars facilitates the freeing of the trash from the teeth. Since the bars are extended farther and farther from the chains, 9, the moving teeth are gradually drawn inward until they no longer project beyond the bars. Thus the teeth and the bars coöperate to strip the trash from the teeth, and the trash is left free to fall by gravity into the receptacle, 20.

I claim as my invention,

1. In an apparatus of the nature described, the combination of a screen structure and a raking structure, the screen structure comprising a series of flexible, inclined screen bars placed side-by-side in planes which are upright and parallel to each other and to the course of the chute and secured only at their lower ends and having their upper ends directed downward and free for the discharge of material therefrom, and said raking structure being located at the downstream side of the screen structure and comprising teeth projecting through the spaces between said screen bars and a series of rake bars for supporting and carrying said teeth and forming a traveling support for said screen bars, substantially as described.

2. In an apparatus of the nature described, the combination of a screen structure and a raking structure, the screen structure comprising a series of flexible, inclined screen bars placed side-by-side in planes which are upright and parallel to each other and to the course of the chute and secured only at their lower ends and having their upper ends directed downward and free for the discharge of material therefrom, said raking structure being located at the down-stream side of the screen structure and comprising teeth projecting through the spaces between said screen bars and a series of rake bars for supporting and carrying said teeth and forming a traveling support for said screen bars, and endless chains carrying said rake bars, substantially as described.

3. In an apparatus of the nature described, the combination of a screen structure and a raking structure, the screen structure comprising a series of flexible, inclined screen bars placed side-by-side in planes which are upright and parallel to each other and to the course of the chute and secured only at their lower ends and having their upper ends directed downward and free for the discharge of material therefrom, said raking structure being located at the down-stream side of the screen structure and comprising teeth projecting through the spaces between said screen bars and a series of rake bars for supporting and carrying said teeth and forming a traveling support for said screen bars, and stationary means for supporting the ends of the rake bars during their movement on the up-stream side of their course, substantially as described.

4. In an apparatus of the nature described, the combination of a screen structure and a raking structure, the screen structure comprising a series of flexible, inclined screen bars placed side-by-side in planes which are upright and parallel to each other and to the course of the chute and secured only at their lower ends and having their portions above the floor supported by the below-mentioned teeth-carrying means and having their portions adjacent the lower portion of the course of the below-mentioned teeth bent to conform to said course, and said raking structure being located at the down-stream side of the screen structure and comprising teeth projecting through the spaces between said screen bars, and means for supporting and carrying said teeth and bearing against said screen bars, substantially as described.

In testimony whereof I have signed my name, in presence of two witnesses, this 16th day of March, in the year one thousand nine hundred and fifteen.

WILLIAM L. SPOON.

Witnesses:
C. E. HARDEE,
H. B. EMERY.